US012010558B2

(12) United States Patent
Xiong

(10) Patent No.: US 12,010,558 B2
(45) Date of Patent: Jun. 11, 2024

(54) DATA TRANSMISSION METHOD AND RELATED APPARATUS

(71) Applicant: TENCENT TECHNOLOGY (SHENZHEN) COMPANY LIMITED, Guangdong (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 358 days.

(21) Appl. No.: 17/512,742

(22) Filed: Oct. 28, 2021

(65) Prior Publication Data

US 2022/0053381 A1 Feb. 17, 2022

Related U.S. Application Data

(63) Continuation of application No. PCT/CN2020/121743, filed on Oct. 19, 2020.

(30) Foreign Application Priority Data

Nov. 13, 2019 (CN) .......................... 201911109143.5

(51) Int. Cl.
  *H04W 28/24* (2009.01)
  *H04W 28/02* (2009.01)
  *H04W 76/10* (2018.01)

(52) U.S. Cl.
  CPC ....... *H04W 28/24* (2013.01); *H04W 28/0268* (2013.01); *H04W 76/10* (2018.02)

(58) Field of Classification Search
  None
  See application file for complete search history.

(56) References Cited

U.S. PATENT DOCUMENTS

| 2018/0006955 A1 | 1/2018 | Bush et al. |
| 2018/0237040 A1 | 8/2018 | Mong et al. |

(Continued)

FOREIGN PATENT DOCUMENTS

| CN | 110213007 A | 9/2019 |
| CN | 110267312 A | 9/2019 |
| CN | 110809295 A | 2/2020 |

OTHER PUBLICATIONS

Supplementary European Search Report issued Jun. 30, 2022 in Application No. 20887585.6, pp. 1-10.

(Continued)

*Primary Examiner* — Hong Shao
(74) *Attorney, Agent, or Firm* — ARENTFOX SCHIFF LLP

(57) ABSTRACT

A data transmission method in which a UE initiates a TSC communication request to establish a TSC transmission channel between a first UE and a second UE is provided. The method includes receiving a TSC communication request that is transmitted by a first UE and that carries a first TSC session requirement parameter, determining a QoS requirement of a first service flow and a QoS requirement of a second service flow according to the first TSC session requirement parameter, and transmitting the QoS requirement of the first service flow to a first PCF, the QoS requirement of the first service flow being for being mapped to a QoS policy of the first service flow by using the first PCF, and transmitting the QoS requirement of the second service flow to a second PCF, the QoS requirement of the second service flow being mapped to a QoS policy of the second service flow by using the second PCF, and the QoS policy of the first service flow and the QoS policy of the second service flow being respectively used for establishing a first QoS flow and a second QoS flow by a first SMF and (Continued)

a second SMF. Apparatus and non-transitory computer-readable medium counterpart embodiments are also provided.

20 Claims, 5 Drawing Sheets

(56) References Cited

U.S. PATENT DOCUMENTS

2021/0152615 A1* 5/2021 Karampatsis ....... H04L 65/1016
2021/0219357 A1* 7/2021 Talebi Fard .......... H04W 76/11

OTHER PUBLICATIONS

Vivo: "Solution# X: Handling of UE to UE communication", 3GPP Draft; S2-1910987, 3rd Generation Partnership Project (3GPP), Mobile Competence Centre ; 650, Route Des Lucioles ; F-06921 Sophia-Antipolis Cedex ; France, vol. SA WG2, no. Reno, USA; Nov. 18, 2019-Nov. 22, 2019, Nov. 8, 2019.

Samsung: "Solution for UE-to-UE TSC", 3GPP Draft; S2-1911611, 3rd Generation Partnership Project (3GPP), Mobile Competence Centre ; 650, Route Des Lucioles ; F-06921 Sophia-Antipolis Cedex; France, vol. SA WG2, no. Reno, USA; Nov. 18, 2019-Nov. 22, 2019, Nov. 8, 2019.

Huawei et al: "UE-UE forwarding rule establishment", 3GPP Draft; S2-1911770, 3rd Generation Partnership Project (3GPP), Mobile Competence Centre ; 650, Route Des Lucioles ; F-06921 Sophia-Antipolis Cedex ; France, vol. SA WG2, no. Reno, USA; Nov. 18, 2019-Nov. 22, 2019, Nov. 8, 2019.

International Search Report issued Jan. 8, 2021, in PCT/CN2020/121743, (5 pages).

Written Opinion issued Jan. 8, 2021, in PCT/CN2020/121743 (5 pages).

* cited by examiner

DATA TRANSMISSION METHOD AND RELATED APPARATUS

RELATED APPLICATIONS

This application is a continuation of International Application No. PCT/CN2020/121743, entitled "DATA TRANSMISSION METHOD AND RELATED APPARATUS" and filed on Oct. 19, 2020, which claims priority to Chinese Patent Application No. 201911109143.5, entitled "DATA TRANSMISSION METHOD AND RELATED APPARATUS," filed on Nov. 13, 2019. The entire disclosures of the above-identified prior applications are incorporated herein by reference in their entirety.

FIELD OF THE TECHNOLOGY

Embodiments of this disclosure relate to the field of communication technologies, including data transmission.

BACKGROUND OF THE DISCLOSURE

Release 16 (R16) of the Fifth Generation (5G) introduces time sensitive communication (TSC) of a time sensitive network (TSN), so that 5G supports an industrial automation manufacturing application with precise time control.

However, in an IP multimedia subsystem (IMS) protocol of the 3rd Generation Partnership Project (3GPP), for service communication between user equipments (UE), the UEs need to be registered with a serving call session control function (S-CSCF) of an IMS system so as to complete communication between the UEs through coordination of the S-CSCF. However, in the TSN of the current R16, it is only defined that a data network (DN) end station (ES) initiates communication to establish TSN communication between a UE ES and the DN ES, but the TSC needs to support at least communication between UEs.

TSC data is transmitted based on a quality of service (QoS) flow in a 3GPP network.

SUMMARY

Embodiments of this disclosure provide a data transmission method and a related apparatus, which may separately trigger establishment of a first QoS flow used for transmitting service data of a first UE, and trigger establishment of a second QoS flow used for transmitting service data of a second UE, so that a UE initiates a TSC communication request to establish a TSC transmission channel between the first UE and the second UE.

A first aspect of this disclosure provides a data transmission method, and the method may include: (1) receiving, by a first network device, a TSC communication request transmitted by a first UE, the TSC communication request including a first TSC session requirement parameter including an identifier of a second UE and a QoS requirement of a TSC session; (2) determining, by the first network device, a QoS requirement of a first service flow, a QoS requirement of a second service flow, first information, and second information, based on the first TSC session requirement parameter; and (3) transmitting, by the first network device, the determined QoS requirement of the first service flow and the determined first information to a first policy control function (PCF) corresponding to the first UE, and transmitting the determined QoS requirement of the second service flow and the determined second information to a second PCF corresponding to the second UE according to the identifier of the second UE, the determined QoS requirement of the first service flow being mapped to a QoS policy of the first service flow by the first PCF, the QoS policy of the first service flow being for establishing, by a first session management function (SMF), a first QoS flow for transmitting service data of the first UE, the determined QoS requirement of the second service flow being mapped to a QoS policy of the second service flow by the second PCF, and the QoS policy of the second service flow being for establishing, by a second SMF, a second QoS flow for transmitting service data of the second UE.

A second aspect of this disclosure provides a data transmission method, and the method may include (1) receiving, by a first PCF, a QoS requirement of a first service flow and first information that are transmitted by a first network device, the first PCF corresponding to a first UE; (2) mapping, by the first PCF, the received QoS requirement of the first service flow to a QoS policy of the first service flow; and (3) transmitting, by the first PCF, the QoS policy of the first service flow and the received first information to a first SMF, the QoS policy of the first service flow being for establishing, by the first SMF, a first QoS flow for transmitting service data of the first UE.

A third aspect of this disclosure provides a data transmission method that includes (1) receiving, by a first SMF, a QoS policy of a first service flow and first information transmitted by a first PCF, the first PCF corresponding to a first UE; and (2) establishing, by the first SMF according to the received QoS policy of the first service flow, a first QoS flow for transmitting service data of the first UE.

A fourth aspect of this disclosure provides a data transmission method, and the method may include (1) receiving, by a second PCF, a QoS requirement of a second service flow and second information that are transmitted by a first network device, the second PCF corresponding to a second UE (2) mapping, by the second PCF, the received QoS requirement of the second service flow to a QoS policy of the second service flow; and (3) transmitting, by the second PCF, the QoS policy of the second service flow and the received second information to a second SMF, the QoS policy of the second service flow being used for establishing, by using the second SMF, a second QoS flow for transmitting service data of the second UE.

A fifth aspect of this disclosure provides a data transmission method that includes the steps of (1) receiving, by a second SMF, a QoS policy of a second service flow and second information that are transmitted by a second PCF, the second PCF corresponding to a second UE; and (2) establishing, by the second SMF according to the received QoS policy of the second service flow, a second QoS flow for transmitting service data of the second UE.

A sixth aspect of this disclosure provides a first network device, comprising circuitry configured to (1) receive TSC communication request transmitted by a first UE, the TSC communication request including a first TSC session requirement parameter including an identifier of a second UE and a QoS requirement of a TSC session (2) determine a QoS requirement of a first service flow, a QoS requirement of a second service flow, first information, and second information based on the first TSC session requirement parameter; and (3) transmit the determined QoS requirement of the first service flow and the determined first information to a first PCF corresponding to the first UE, and transmit the determined QoS requirement of the second service flow and the determined second information to a second PCF corresponding to the second UE according to the identifier of the second UE, the determined QoS requirement of the first service flow being mapped to a QoS policy of the first service flow by the first PCF, the QoS policy of the first service flow being for establishing, by a first SMF, a first QoS flow for transmitting service data of the first UE, the determined QoS requirement of the second service flow being mapped to a QoS policy of the second service flow by the second PCF, and the QoS policy of the second service flow being for establishing, by a second SMF, a second QoS flow for transmitting service data of the second UE.

In one implementation, the determining module is configured to determine a latency requirement in the QoS requirement of the first service flow and a latency requirement in the QoS requirement of the second service flow.

In one implementation, the determining module is configured to determine, when the first UE and the second UE are connected to different UPF network elements, the latency requirement in the determined QoS requirement of the first service flow according to a latency in the first TSC session requirement parameter, a latency between the first UE and a device-side TSN translator (DS-TT), a transmission latency of a network-side TSN translator (NW-TT) of the first UE, a latency between the second UE and the DS-TT, and a transmission latency of an NW-TT of the second UE, and determine the latency requirement in the determined QoS requirement of the second service flow according to the latency in the first TSC session requirement parameter, the latency between the first UE and the DS-TT, the transmission latency of the NW-TT of the first UE, the latency between the second UE and the DS-TT, and the transmission latency of the NW-TT of the second UE.

In one implementation, the determining module is configured to determine, when the first UE and the second UE are connected to a same UPF network element, the latency requirement in the determined QoS requirement of the first service flow according to a latency in the first TSC session requirement parameter, a latency between the first UE and a DS-TT, and a latency between the second UE and the DS-TT, and determine the latency requirement in the determined QoS requirement of the second service flow according to a latency corresponding to the QoS requirement of the second service flow, the latency between the first UE and the DS-TT, and the latency between the second UE and the DS-TT.

In one implementation, the transmitting module is further configured to transmit the latency requirement in the determined QoS requirement of the first service flow to the first PCF, so that the first SMF sets a PDB value of the first QoS flow to be less than or equal to a latency value in the QoS policy of the first service flow, the latency value in the QoS policy of the first service flow being obtained by the first PCF according to a value corresponding to the latency requirement in the QoS requirement of the first service flow; and the transmitting module is further configured to transmit the latency requirement in the determined QoS requirement of the second service flow to the second PCF, so that the second SMF sets a PDB value of the second QoS flow to be less than or equal to a latency value in the QoS policy of the second service flow, the latency value in the QoS policy of the second service flow being obtained by the second PCF according to a value corresponding to the latency requirement in the QoS requirement of the second service flow.

In one implementation, the determining module is further configured to before the transmitting module transmits the determined QoS requirement of the first service flow and the determined first information to the first PCF corresponding to the first UE, determine the first PCF according to an identifier of the first UE.

In one implementation, the determining module is further configured to (1) determine the second PCF corresponding to the second UE according to the identifier of the second UE; and (2) the transmitting module is configured to transmit the determined QoS requirement of the second service flow and the determined second information to the second PCF.

A seventh aspect of this disclosure provides a first PCF, which may include circuitry configured to (1) receive a QoS requirement of a first service flow and first information that are transmitted by a first network device, the first PCF corresponding to a first UE; (2) map the received QoS requirement of the first service flow to a QoS policy of the first service flow; and (3) transmit the QoS policy of the first service flow and the received first information to a first SMF, the QoS policy of the first service flow being for establishing, by the first SMF, a first QoS flow for transmitting service data of the first UE.

In one implementation, the circuitry is further configured to receive a latency requirement in the received QoS requirement of the first service flow transmitted by the first network device; and the circuitry is further configured to transmit a latency value in the QoS policy of the first service flow to the first SMF, so that the first SMF sets a PDB value of the first QoS flow to be less than or equal to a latency value in the QoS policy of the first service flow, the latency value in the QoS policy of the first service flow being obtained by the first PCF according to a value corresponding to the latency requirement in the received QoS requirement of the first service flow.

An eighth aspect of this disclosure provides a first SMF, which may include circuitry configured to (1) receive a QoS policy of a first service flow and first information that are transmitted by a first PCF, the first PCF corresponding to a first UE; and (2) an establishment module, configured to establish, according to the received QoS policy of the first service flow, a first QoS flow for transmitting service data of the first UE.

In one implementation, the circuitry is further configured to (1) receive a latency value in the received QoS policy of the first service flow transmitted by the first PCF; and (2) establish, according to the received QoS policy of the first service flow when setting a PDB value of the first QoS flow to be less than or equal to the latency value in the QoS policy of the first service flow, the first QoS flow for transmitting the service data of the first UE.

In one implementation, the circuitry is further configured to after the first QoS flow for transmitting the service data of the first UE is established according to the QoS policy of the first service flow, map the received QoS policy of the first service flow and TSC assistance information (TSCAI) information to an N2 session message, and map the QoS policy of the first service flow to an N1 session message, the first information including the TSCAI information.

A ninth aspect of this disclosure provides a second PCF, which includes circuitry configured to (1) receive a QoS requirement of a second service flow and second information that are transmitted by a first network device, the second PCF corresponding to a second UE; (2) map the received QoS requirement of the second service flow to a QoS policy of the second service flow; and (3) transmit the QoS policy of the second service flow and the received second information to a second SMF, the QoS policy of the second service flow being used for establishing, by using the second SMF, a second QoS flow for transmitting service data of the second UE.

In one implementation, the circuitry is further configured to (1) receive a latency requirement in the QoS requirement of the second service flow transmitted by the first network device; and (2) transmit a latency value in the QoS policy of the second service flow to the second SMF, so that the second SMF sets a PDB value of the second QoS flow to be less than or equal to a latency value in the QoS policy of the second service flow, the latency value in the QoS policy of the second service flow being obtained by the second PCF according to a value corresponding to the latency requirement in the QoS requirement of the second service flow.

A tenth aspect of this disclosure provides a second SMF, which may include circuitry configured to (1) receive a QoS policy of a second service flow and second information that are transmitted by a second PCF, the second PCF corresponding to a second UE; and (2) establish, according to the received QoS policy of the second service flow, a second QoS flow for transmitting service data of the second UE.

In one implementation, the circuitry is further configured to (1) receive a latency value in the QoS policy of the second service flow transmitted by the second PCF; and (2) establish, according to the QoS policy of the second service flow when setting a PDB value of the second QoS flow to be less than or equal to the latency value in the QoS policy of the second service flow, the second QoS flow for transmitting the service data of the second UE.

In one implementation, the circuitry is further configured to after the second QoS flow for transmitting the service data of the second UE is established according to the received QoS policy of the second service flow, map the QoS policy of the second service flow and TSCAI information to an N2 session message, and map the received QoS policy of the second service flow to an N1 session message, the second information including the TSCAI information.

An eleventh aspect of this disclosure provides a first network device, which may include a communication interface, processing circuitry, and a memory. The memory is configured to store computer-executable instructions. When the first network device runs, the communication interface is configured to execute actions executed by the receiving module and the transmitting module in the first aspect or any possible implementation of the first aspect, and the processing circuitry executes the computer-executable instructions stored in the memory, so as to execute actions executed by the determining module in the first aspect or any possible implementation of the first aspect.

A twelfth aspect of this disclosure provides a first PCF, which may include a communication interface, processing circuitry, and a memory. The memory is configured to store computer-executable instructions. When the first PCF runs, the communication interface is configured to execute actions executed by the receiving module and the transmitting module in the second aspect or any possible implementation of the second aspect, and the processing circuitry executes the computer-executable instructions stored in the memory, so as to execute actions executed by the mapping module in the second aspect or any possible implementation of the second aspect.

A thirteenth aspect of this disclosure provides a first SMF, which may include a communication interface, processing circuitry, and a memory. The memory is configured to store a computer-executable instructions. When the first SMF runs, the communication interface is configured to execute actions executed by the receiving module in the third aspect or any possible implementation of the third aspect, and the processing circuitry executes the computer-executable instructions stored in the memory, so as to execute actions executed by the establishment module and the mapping module in the third aspect or any possible implementation of the third aspect.

A fourteenth aspect of this disclosure provides a second PCF, which may include a communication interface, processing circuitry, and a memory. The memory is configured to store computer-executable instructions. When the second PCF runs, the communication interface is configured to execute actions executed by the receiving module and the transmitting module in the fourth aspect or any possible implementation of the fourth aspect, and the processing circuitry executes the computer-executable instructions stored in the memory to execute actions executed by the mapping module in the fourth aspect or any possible implementation of the fourth aspect.

A fifteenth aspect of this disclosure provides a second SMF, which may include a communication interface, processing circuitry, and a memory. The memory is configured to store computer-executable instructions. When the second SMF runs, the communication interface is configured to execute actions executed by the receiving module in the fifth aspect or any possible implementation of the fifth aspect, and the processing circuitry executes the computer-executable instructions stored in the memory, so as to execute actions executed by the establishment module and the mapping module in the fifth aspect or any possible implementation of the fifth aspect.

A sixteenth aspect of this disclosure provides a non-transitory computer-readable storage medium, the computer-readable storage medium storing instructions, which when executed on a computer, cause the computer to perform the methods in the first aspect to the fifth aspect.

According to the foregoing technical solutions, the embodiments of this disclosure have the following advantages.

In the embodiments of this disclosure, the first UE initiates a TSC communication request, so that after determining the QoS requirement of the first service flow and the QoS requirement of the second service flow, the first network device separately provides the QoS requirement of the first service flow and the QoS requirement of the second service flow to 5G networks in which the first UE and the second UE are located, thereby separately triggering establishment of the first QoS flow used for transmitting the service data of the first UE, and triggering establishment of the second QoS flow used for transmitting the service data of the second UE, so that the UE initiates the TSC communication request to establish the TSC transmission channel between the first UE and the second UE.

BRIEF DESCRIPTION OF THE DRAWINGS

To describe the technical solutions in the embodiments of this disclosure more clearly, the accompanying drawings required for describing the embodiments are briefly described below. The accompanying drawings in the following description show merely some embodiments of this disclosure.

DESCRIPTION OF EMBODIMENTS

The embodiments of this disclosure will be described in the following with reference to the accompanying drawings. The described embodiments are merely some rather than all of the embodiments of this disclosure. A person of ordinary skill in the art may know that as the technology evolves and a new scenario emerges, the technical solutions provided in the embodiments of this disclosure are also applicable to a similar technical problem.

In this specification, the claims, and the accompanying drawings of this disclosure, the terms "first," "second," and so on are intended to distinguish similar objects but do not necessarily indicate a specific order or sequence. It is to be understood that the data used in such a way is interchangeable in proper cases, so that the embodiments described herein can be implemented in other orders than the order illustrated or described herein. Moreover, the terms "comprise," "include," and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

Embodiments of this disclosure provide a data transmission method, which may separately trigger establishment of a first QoS flow used for transmitting service data of a first UE, and trigger establishment of a second QoS flow used for transmitting service data of a second UE, so that a UE initiates a TSC communication request to establish a TSC transmission channel between the first UE and the second UE. An embodiment of this disclosure further provides a related apparatus. Detailed descriptions are separately performed below.

The data transmission method provided in the embodiments of this disclosure may be applied to a 5G network, or may be applied to another network that can support TSC data transmission. The following uses the 5G network as an example for description.

Figure 1:
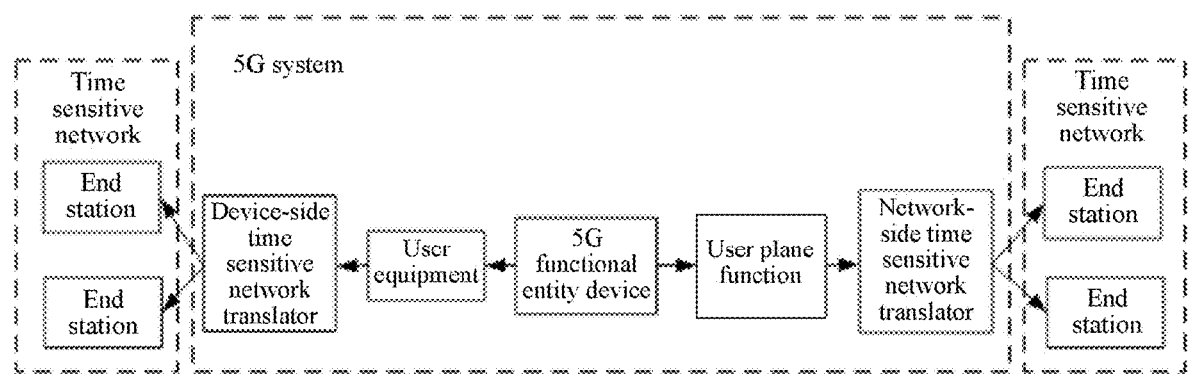
FIG. 1 is a schematic structural diagram of a TSN communication system according to an embodiment of this disclosure.

TSC is introduced in R16 of a 5G system, and enables the 5G system to support an industrial automation manufacturing application with precise time control. According to guidelines of R16 of the 5G system, the 5G system can be integrated into a TSN as an Ethernet bridge of the TSN, and the integrated system can be referred to as a TSN communication system. FIG. 1 is a schematic structural diagram of a TSN communication system according to an exemplary embodiment of this disclosure. As shown in the figure, the TSN communication system includes a TSN and a 5G system.

The 5G system includes a UE and various functional entity devices. These functional entity devices mainly include: ① a user plane function (UPF); ② an NG radio access network (NG RAN), where an NG interface is an interface between a radio access network and a 5G core network; ③ an access and mobility management function (AMF), which is responsible for mobility management and is connected to the UE and the NG RAN; ④ an SMF, which is responsible for session management and is connected to the AMF and the UPF; ⑤ a PCF, which is responsible for policy control and is connected to the SMF; ⑥ a unified data manager (UDM), configured to perform unified management on service data; and ⑦ an application function (AF), configured to provide service data. The TSN includes an end station (ES) and a centralized network controller (CNC), and the CNC is configured to perform unified management on services of an entire TSN communication system. As shown in FIG. 1, the UE in the 5G system is connected to one or more ESs in a TSN DN outside the 5G system by using a DS-TT. The UPF is connected to one or more ESs in the TSN DN by using an NW-TT. Both the DS-TT and the NW-TT may provide a port used for data transmission.

In the TSN, the UE and a time sensitive communication device such as a DS-TT belong to a device side of bridge, and the device side of bridge is connected to the time sensitive communication system (TSC system). The UPF network element includes a TSC NW-TT.

To achieve this transparency to the TSN network and a 5G system (5GS) as the appearance of any other TSN bridge, the 5GS provides TSN input and output ports via the DS-TT and the NW-TT. The DS-TT and the NW-TT support the following functions:

(1) reservation and forwarding functions to eliminate jitter; and (2) link layer connectivity discovery and reporting.

The UE may include a handheld terminal, a notebook computer, a subscriber unit, a cellular phone, a smartphone, a wireless data card, a personal digital assistant (PDA) computer, a tablet computer, a wireless modem, a handheld, a laptop computer, a cordless phone, or a wireless local loop (WLL), a machine type communication (MTC) terminal, or another device that can access a network. The UE communicates with the access network device by using a certain air interface technology.

In the foregoing network elements shown in FIG. 1, the UE transmits uplink data, and the UPF transmits downlink data. When the UE transmits uplink data or the UPF transmits downlink data, if the transmitted data is TSC data, the TSC data needs to be mapped to a QoS flow for transmission.

Figure 2:
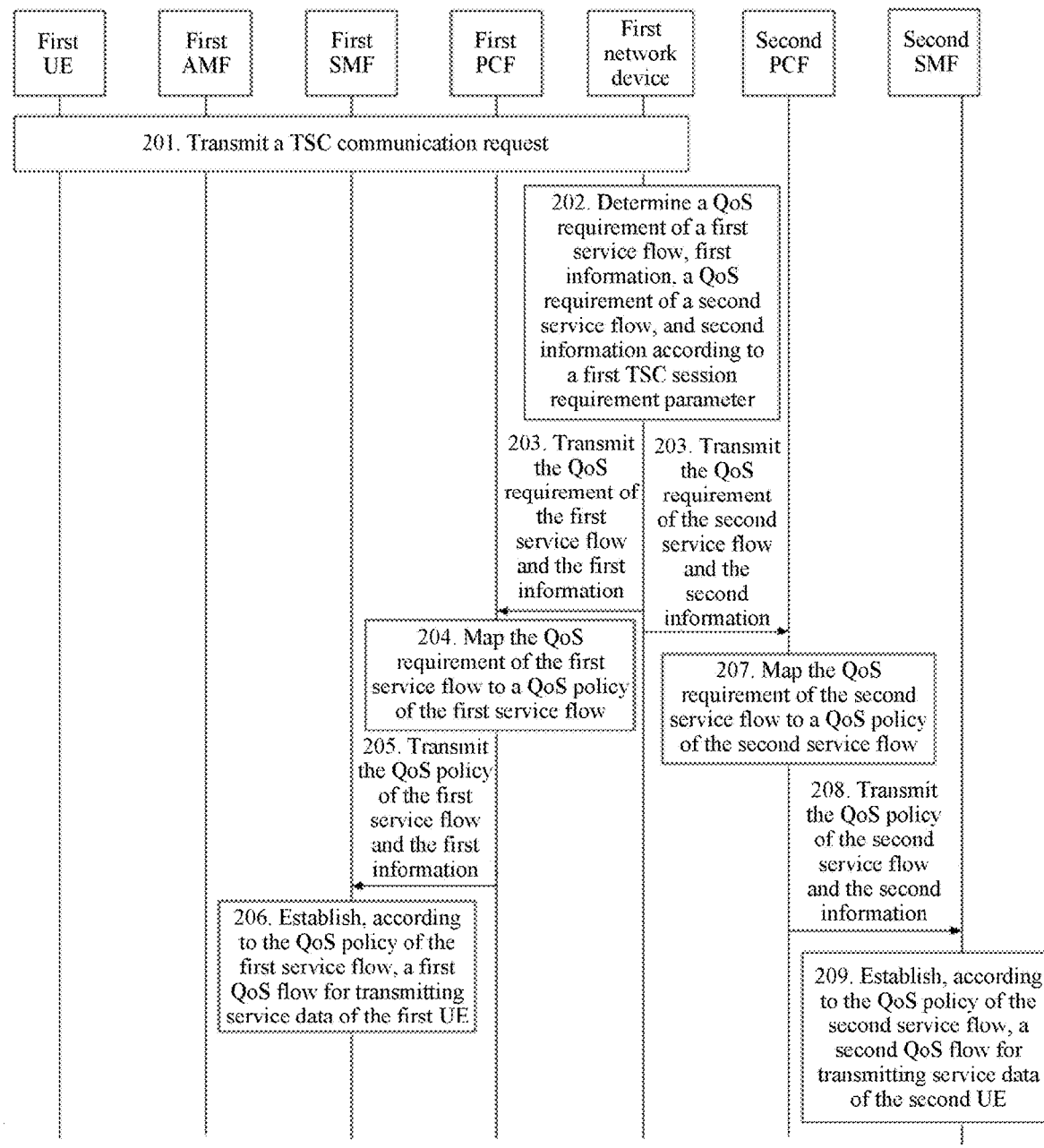
FIG. 2 is a schematic diagram of a data transmission method according to an embodiment of this disclosure.

It is to be understood that, in the embodiments of this disclosure, a first network device includes an AF and a CNC. To better understand the solutions provided in the embodiments of this disclosure, the following describes a specific procedure in the embodiments. FIG. 2 shows a data transmission method provided in an embodiment. The method may include the following steps.

In step 201, a first UE transmits a TSC communication request to a first network device.

In this embodiment, the TSC communication request may be transparently transmitted by the first UE to the first network device after successively passing through a first AMF, a first SMF, and a first PCF. The TSC communication request carries a first TSC session requirement parameter, where a TSC session requirement container is added to the TSC communication request. The first TSC session requirement parameter is a parameter included in the TSC session requirement container. For example, the first TSC session requirement parameter may include an identifier of a second UE and TSC stream QoS requirements. For another example, the TSC stream QoS requirements in the TSC session may include end-to-end latency information, a data periodicity, and a burst arrival time of data between the first UE and the second UE. Certainly, in actual application, the first TSC session requirement parameter may further include an application ID or the like. One TSC session may include a plurality of TSC session flows, and an operation process of each TSC session flow is similar.

The described QoS requirement of the TSC session is a service requirement of TSC established by the first UE in a TSN clock domain, for example, a total transmission latency required by the first UE to transmit service data to the second UE.

In addition, the first network device may include an AF and a CNC. Therefore, the TSC communication request may alternatively be transparently transmitted from the first PCF to the AF, and the AF transparently transmits the CNC communication request to the CNC.

In some embodiments, the described TSC communication request may include a PDU session modification request or a PDU session establishment request, which is not specifically limited in this embodiment of this disclosure.

In step 202, the first network device determines a QoS requirement of a first service flow, a QoS requirement of a second service flow, first information, and second information according to the first TSC session requirement parameter.

Actually, the first information may include TSCAI information of the first UE and TSC port management information of the first UE, and the second information may include TSCAI information of the second UE and TSC port management information of the second UE. The described TSC assistance information (TSCAI) is actually information about a data flow. As described above, the purpose of introducing TSC into R16 of the 5G system is to enable the 5G system to support an industrial automation manufacturing application with precise time control, and the TSCAI information can help to precisely control the data flow. Therefore, after determining the first information and the second information according to the first TSC session requirement parameter, the first network device may respectively transmit the first information and the second information to the first PCF corresponding to the first UE and a second PCF corresponding to the second UE, so that the first PCF further transmits the first information to an NG RAN network element corresponding to the first UE by using the first SMF and the first AMF, so that the NG RAN network element can perform precise time control on the data flow according to the TSCAI information in the first information. Similarly, the second PCF further transmits the second information to an NG RAN network element corresponding to the second UE by using a second SMF and a second AMF, so that the NG RAN network element can perform precise time control on the data flow according to the TSCAI information in the second information. The following describes the TSCAI.

The TSCAI describes a TSC traffic feature used in the 5G system. Knowledge of a TSN traffic pattern is useful for a gNB (a 5G base station) to allow the gNB to more effectively schedule periodic, deterministic service flows by configuring authorization, semi-persistent scheduling, or dynamic authorization. For a definition of the TSCAI information, refer to the following Table 1. The TSCAI information is respectively provided by the first AMF and the second AMF to corresponding NG RAN network elements. For example, after the first SMF and the second SMF respectively transmit the TSCAI information to the corresponding first AMF and second AMF in a process of establishing QoS flows, the first AMF and the second AMF provide the TSCAI information to the respective NG RAN network elements.

TABLE 1

| TSCAI information | |
|---|---|
| Assistance information | Description |
| Data flow direction | TSC service data flow direction (uplink or downlink) |
| Periodicity | Time period between the beginnings of two bursts |
| Burst arrival time | Data burst arrival time is at an ingress of an RAN (downlink flow direction) or an egress interface of a UE (uplink flow direction). |

The above table includes the burst arrival time of the TSC service data and the periodicity of the service data. After the burst arrival time arrives, the TSC service data arrives at the NG RAN network element packet by packet within time specified by periodicity.

It may be further understood that the described TSCAI information and a QoS parameter of the QoS flow are in a 5G clock domain, and the QoS requirement of the first service flow and the QoS requirement of the second service flow are actually QoS requirements reallocated to the first UE and the second UE in a TSN clock domain in which the first network device is located. That is, the QoS requirement of the TSC session received by the first network device is established in the TSN clock domain, is an end-to-end QoS requirement, and needs to be broken down into requirements related to the first UE and the second UE, thereby implementing a total end-to-end QoS requirement. In addition, the first network device usually needs to adjust the QoS requirement of the TSC session in the TSN clock domain according to a network configuration, so as to update and generate a QoS requirement of a second TSC session, and obtain the described QoS requirement of the first service flow and the described QoS requirement of the second service flow again according to the QoS requirement of the second TSC session. For example, it is assumed that a latency in the foregoing received QoS requirement of the TSC session is an end-to-end total transmission latency between the first UE and the second UE and is 2000 microseconds, and the first network device needs to update the latency of 2000 microseconds in the QoS requirement of the TSC session in the TSN clock domain to 1800 microseconds according to the network configuration. Then, the first network device determines, according to 1800 microseconds in the updated QoS requirement of the second TSC session, that the QoS requirements allocated equally to the first UE and the second UE are 800 microseconds, for example, 1800/2=900, 900 microseconds minus a latency of some other 100 microseconds to obtain 800 microseconds. That is, both the QoS requirement of the first service flow and the QoS requirement of the second service flow are 800 microseconds. In actual application, another reallocation manner may be further used, which is not specifically limited in this embodiment of this disclosure.

The latency in the described updated QoS requirement of the TSC session may be calculated to be used for the QoS requirement of the first service flow of the first UE and used for the QoS requirement of the second service flow of the second UE. For details, refer to step 303 in FIG. 3. Details are not described herein.

In step 203, the first network device transmits the QoS requirement of the first service flow and the first information to the first PCF corresponding to the first UE, and transmits the QoS requirement of the second service flow and the second information to the second PCF corresponding to the second UE according to an identifier of the second UE.

In this embodiment, the first network device respectively provides QoS requirements of services flow to 5G networks in which the first UE and the second UE are located. The first network device transmits the QoS requirement of the first service flow to the first PCF corresponding to the first UE, and transmits the QoS requirement of the second service flow to the second PCF corresponding to the second UE.

The first PCF and the second PCF described above are different network elements.

In some other embodiments, before the first network device transmits the QoS requirement of the first service flow and the first information to the first PCF corresponding to the first UE, the first network device further needs to determine the first PCF according to an identifier of the first UE, so as to provide a correct node for subsequent signaling transmission and establish a signaling transmission path. Similarly, in some other embodiments, when transmitting the QoS requirement of the second service flow and the second information to the second PCF corresponding to the second UE according to the identifier of the second UE, the first network device may first determine the second PCF according to the identifier of the second UE, so as to provide a correct node for subsequent signaling transmission and establish a signaling transmission path. Further, the QoS requirement of the second service flow and the second information are transmitted to the second PCF.

After receiving the first TSC session requirement parameter transmitted by the AF, the CNC may determine the QoS requirement of the first service flow, the first information, the QoS requirement of the second service flow, and the second information according to the first TSC session requirement parameter. Then, the QoS requirement of the first service flow, the first information, the QoS requirement of the second service flow, and the second information are transmitted to the AF. In this case, after receiving the QoS requirement of the first service flow, the first information, the QoS requirement of the second service flow, and the second information, the AF may determine the first PCF by using the identifier of the first UE, and determine the second PCF by using the identifier of the second UE.

In step 204, the first PCF maps the QoS requirement of the first service flow to a QoS policy of the first service flow.

In this embodiment, the 5G communication system sets a QoS flow according to a QoS requirement of the service flow, and the first PCF is responsible for policy control of the first UE. Therefore, after the QoS requirement of the first service flow transmitted by the first network device is received, the QoS requirement of the first service flow may be mapped to the QoS policy of the first service flow. In this way, the QoS policy of the first service flow may be transmitted to the corresponding first SMF, so that the first SMF maps the first service flow to a QoS flow according to the QoS policy of the first service flow, thereby establishing a first QoS flow for transmitting service data of the first UE.

In step 205, the first PCF transmits the QoS policy of the first service flow and the first information to the first SMF.

In step 206, the first SMF establishes, according to the QoS policy of the first service flow, the first QoS flow for transmitting the service data of the first UE.

In this embodiment, because the QoS policy of the first service flow includes a QoS parameter applied to establishment of the QoS flow, the first SMF may establish, according to the QoS parameter included in the QoS policy of the first service flow, the first QoS flow for transmitting the service data of the first UE. When the first QoS flow is established for the first UE, the TSC port management information in the first information may be used for allocating a first port on a corresponding DS-TT and a second port on an NW-TT to the first QoS flow, so as to form a port pair.

In some other embodiments, the first information includes the described TSCAI information of the first UE. Therefore, after the first SMF establishes, according to the QoS policy of the first service flow, the first QoS flow for transmitting the service data of the first UE, the first SMF further maps the QoS policy of the first service flow and the TSCAI information to an N2 session message, and maps the QoS policy of the first service flow to an N1 session message.

In this embodiment, the first SMF may map the QoS parameter included in the QoS policy of the first service flow to a QoS profile, then load it into the N2 session message with reference to the TSCAI information included in the foregoing received first information, and provide the N2 session message to the 5G base station gNB corresponding to the first UE. In addition, the QoS parameter included in the QoS policy of the first service flow further needs to be mapped to a QoS rule, and DS-TT port configuration information included in the received first information needs to be loaded into the N1 session message to be provided to the first UE. It is to be understood that, because the described TSCAI information is a parameter value based on the TSN clock domain, the first SMF needs to convert the TSCAI information into a clock domain value of the 5G system in a form of mapping or the like.

In step 207, the second PCF maps the QoS requirement of the second service flow to a QoS policy of the second service flow.

In this embodiment, the 5G communication system sets a QoS flow according to a QoS requirement of the service flow, and the second PCF is responsible for policy control of the second UE. Therefore, after the QoS requirement of the second service flow transmitted by the first network device is received, the QoS requirement of the second service flow may be mapped to the QoS policy of the second service flow. In this way, the QoS policy of the second service flow may be transmitted to the corresponding second SMF, so that the second SMF maps the second service flow to a QoS flow according to the QoS policy of the second service flow, thereby establishing a second QoS flow for transmitting service data of the second UE.

In step 208, the second PCF transmits the QoS policy of the second service flow and the second information to the second SMF.

In step 209, the second SMF establishes, according to the QoS policy of the second service flow, the second QoS flow for transmitting the service data of the second UE.

In this embodiment, because the QoS policy of the second service flow includes a QoS parameter applied to establishment of the QoS flow, the second SMF may establish, according to the QoS parameter included in the QoS policy of the second service flow, the second QoS flow for transmitting the service data of the second UE. When the second QoS flow is established for the second UE, the TSC port management information in the second information may be used for allocating a first port on a corresponding DS-TT and a second port on an NW-TT to the second QoS flow, so as to form a port pair.

In some other embodiments, the second information includes the described TSCAI information of the second UE. Therefore, after the second SMF establishes, according to the QoS policy of the second service flow, the second QoS flow for transmitting the service data of the second UE, the second SMF further maps the QoS policy of the second service flow and the TSCAI information to an N2 session message, and maps the QoS policy of the second service flow to an N1 session message.

In this embodiment, the second SMF may map the QoS parameter included in the QoS policy of the second service flow to a QoS profile, then load it into the N2 session message with reference to the TSCAI information included in the foregoing received second information, and provide the N2 session message to the 5G base station gNB corresponding to the second UE. In addition, the QoS parameter included in the QoS policy of the second service flow further needs to be mapped to a QoS rule, and the DS-TT port configuration information included in the received second information needs to be loaded into the N1 session message to be provided to the second UE. It is to be understood that, because the described TSCAI information is a parameter value based on the TSN clock domain, the second SMF needs to convert the TSCAI information into a clock domain value of the 5G system in a form of mapping or the like.

It is to be understood that an execution sequence of steps 204-206 and steps 207-209 is not limited. In actual application, steps 207-209 may be performed before steps 204-206, or steps 204-206 and steps 207-209 may be performed synchronously. This is not specifically limited in this embodiment of this disclosure.

In this embodiment of this disclosure, the first UE initiates a TSC communication request, so that after determining the QoS requirement of the first service flow and the QoS requirement of the second service flow, the first network device separately provides the QoS requirement of the first service flow and the QoS requirement of the second service flow to 5G networks in which the first UE and the second UE are located, thereby separately triggering establishment of the first QoS flow used for transmitting the service data of the first UE, and triggering establishment of the second QoS flow used for transmitting the service data of the second UE, so that the UE initiates the TSC communication request to establish the TSC transmission channel between the first UE and the second UE.

Figure 3:
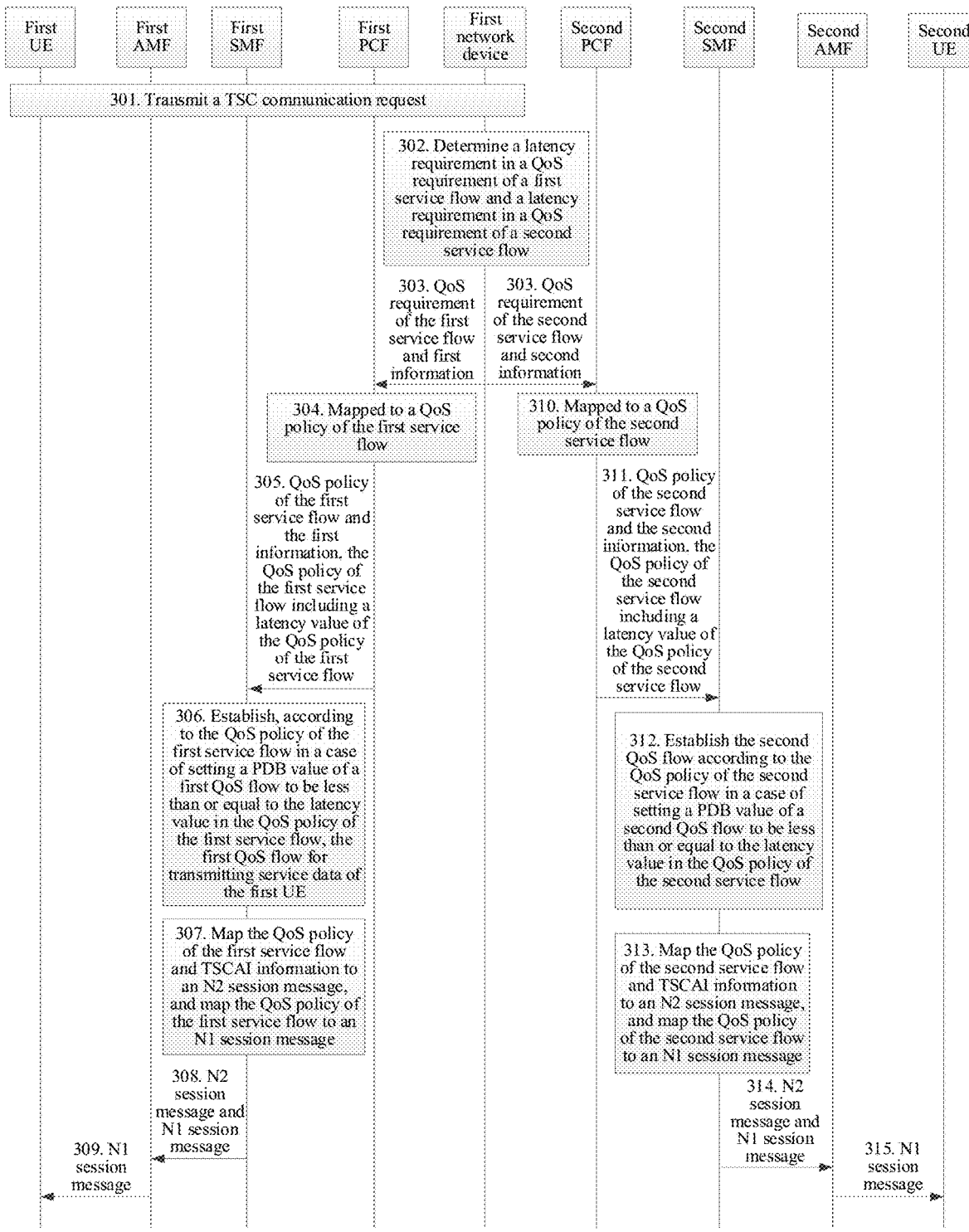
FIG. 3 is a schematic diagram of another data transmission method according to an embodiment of this disclosure.

To better understand the solutions provided in this embodiment of this disclosure, based on the foregoing embodiment described in FIG. 2, the following describes a specific procedure in this embodiment. FIG. 3 shows a data transmission method provided in this embodiment. The method may include the following steps.

In step 301, a first UE transmits a TSC communication request to a first network device.

In this embodiment, the TSC communication request carries a first TSC session requirement parameter, where a TSC session requirement container is added to the TSC communication request. The first TSC session requirement parameter is a parameter included in the TSC session requirement container. For example, the first TSC session requirement parameter may include an identifier of a second UE and TSC stream QoS requirements. For another example, the TSC stream QoS requirements may include latency information, a data periodicity, and a burst arrival time of data between the first UE and the second UE. Certainly, in actual application, the first TSC session requirement parameter may further include an application ID and the like.

The described TSC session QoS requirement is a service requirement of TSC established by the first UE in a TSN clock domain.

In some embodiments, the described TSC communication request may include a PDU session modification request or a PDU session establishment request, which is not specifically limited in this embodiment.

In step 302, the first network device determines a latency requirement in a QoS requirement of a first service flow and a latency requirement in a QoS requirement of a second service flow.

In this embodiment, a QoS flow is set in 5G according to a TSC session QoS requirement, and an important feature of the TSC session QoS requirement is a latency requirement. For TSC communication, TSC communication between the first UE and the second UE usually requires a very precise latency. Therefore, the first network device may determine the latency requirement in the QoS requirement of the first service flow and determine the latency requirement in the QoS requirement of the second service flow according to the first TSC session requirement parameter. The latency requirement in the QoS requirement of the first service flow is used for a latency requirement required for establishing a first QoS flow for the first UE, and the latency requirement in the QoS requirement of the second service flow is used for a latency requirement required for establishing a second QoS flow for the second UE.

In addition, the latency requirement in the QoS requirement of the first service flow is a parameter in the QoS requirement of the first service flow, and the latency requirement in the QoS requirement of the second service flow is a parameter in the QoS requirement of the second service flow.

In some embodiments, the first UE may be connected to a corresponding first UPF, and the second UE may be connected to a corresponding second UPF. That is, when the first UE and the second UE are connected to different UPF network elements, the following method may be used for determining the latency requirement in the QoS requirement of the first service flow and the latency requirement in the QoS requirement of the second service flow.

The first network device determines the latency requirement in the QoS requirement of the first service flow according to a latency in the first TSC session requirement parameter, a latency between the first UE and a DS-TT, a transmission latency of an NW-TT of the first UE, a latency between the second UE and the DS-TT, and a transmission latency of an NW-TT of the second UE; and similarly, may determine the latency requirement in the QoS requirement of the second service flow according to the latency in the first TSC session requirement parameter, the latency between the first UE and the DS-TT, the transmission latency of the NW-TT of the first UE, the latency between the second UE and the DS-TT, and the transmission latency of the NW-TT of the second UE.

In particular, see the following formulas.

Latency requirement in the QoS requirement of the first service flow $= \dfrac{A-B-C-D-E}{2}$ (Formula 1)

Latency requirement in the QoS requirement of the second service flow $= \dfrac{A-B-C-D-E}{2}$. (Formula 2)

Here, A is the latency in the first TSC session requirement parameter, B is the latency between the first UE and the DS-TT, C is the transmission latency of the NW-TT of the first UE, D is the latency between the second UE and the DS-TT, and E is the transmission latency of the NW-TT of the second UE.

That is, the latency requirement in the QoS requirement of the first service flow may be equal to the latency requirement in the QoS requirement of the second service flow.

The described latency between the first UE and the DS-TT is measured by the DS-TT connected to the first UE. After the latency between the first UE and the DS-TT is obtained, the latency is reported transparently to the first network device through the first UE, a first SMF, and the first PCF. The described transmission latency of the NW-TT of the first UE refers to a communication latency between the NW-TT of the first UE and an external TSN DN, and is measured by the NW-TT connected to the first UE. After the value is obtained, the value is reported transparently to the first network device through a first UPF, the first SMF, and the first PCF. Similarly, because the first UE and the second UE are connected to different entity network elements, the described latency between the second UE and the DS-TT is measured by the DS-TT connected to the second UE. After the latency between the second UE and the DS-TT is obtained, the latency is transparently reported to the first network device through the second UE, a second SMF, and a second PCF. The described transmission latency of the NW-TT of the second UE is measured by the NE-TT connected to the second UE. After the latency between the NW-TT of the second UE and the external TSN DN is obtained, the latency is transparently reported to the first network device through a second UPF, the second SMF, and the second PCF.

In some other embodiments, the first UE and the second UE may be connected to the same UPF network element. In this case, when the first UE and the second UE are connected to the same UPF network element, the following method may be used for determining the latency requirement in the QoS requirement of the first service flow and the latency requirement in the QoS requirement of the second service flow.

The first network device determines the latency requirement in the QoS requirement of the first service flow according to a latency in the first TSC session requirement parameter, a latency between the first UE and a DS-TT, and a latency between the second UE and the DS-TT; and similarly, determines the latency requirement in the QoS requirement of the second service flow according to the latency in the first TSC session requirement parameter, the latency between the first UE and the DS-TT, and the latency between the second UE and the DS-TT.

In particular, see the following formulas.

Latency requirement in the QoS requirement of the first service flow $= \dfrac{A-B-D}{2}$. (Formula 3)

Latency requirement in the QoS requirement of the second service flow $= \dfrac{A-B-D}{2}$. (Formula 4)

The first network device may determine, by using bridge ID information reported by the NW-TT and the UPF, whether the first UE and the second UE are connected to the same UFP network element. If a bridge ID and an ID of the UFP network element are the same, the first network device may determine that the first UE and the second UE are connected to the same UPF.

In this case, because the NW-TT is a part of function of the UPF, communication between the first UE and the second UE is performed inside the UPF and the NW-TT, and no data exchange and communication is required between the UPF and the NW-TT with the external TSN DN. Therefore, when respectively calculating the latency requirement in the QoS requirement of the first service flow and the latency requirement in the QoS requirement of the second service flow by using (formula 1) and (formula 2), the first network device needs to set both the transmission latency of the NW-TT of the first UE and the transmission latency of the NW-TT of the second UE to be zero or does not use the transmission latency of the NW-TT of the first UE and the transmission latency of the NW-TT of the second UE, thereby respectively obtaining the foregoing (formula 3) and (formula 4).

The first network device calculates the latency requirement in the QoS requirement of the first service flow and the latency requirement in the QoS requirement of the second service flow based on a time calculation unit ratio rateRatio=1 of the TSN clock domain relative to the 5G clock domain. If the time calculation unit ratio rateRatio of the TSN clock domain to the 5G clock domain is not equal to 1, time parameters of the TSN clock domain in the foregoing (formula 1) to (formula 4) need to be all mapped to time parameters of the 5G clock domain. For example, "a latency corresponding to a QoS requirement of a service flow" of the TSN clock domain is divided by rateRatio to obtain "a latency corresponding to a QoS requirement of a service flow" of the 5G clock domain, and then calculation is performed.

In step 303, the first network device transmits the QoS requirement of the first service flow and the first information to the first PCF corresponding to the first UE, and transmits the QoS requirement of the second service flow and the second information to the second PCF corresponding to the second UE.

In this embodiment, because the TSC communication request may include a PDU session creation request or a PDU session modification request, in a process of the PDU session creation request or the PDU session modification request, the first network device needs to calculate the latency requirement in the QoS requirement of the first service flow by using the foregoing (formula 1) and (formula 3) according to the latency in the first TSC session requirement parameter, the latency between the first UE and the DS-TT, the transmission latency of the NW-TT of the first UE, the latency between the second UE and the DS-TT, and the transmission latency of the NW-TT of the second UE; calculate the latency requirement in the QoS requirement of the second service flow by using the foregoing (formula 2) and (formula 4) according to the latency in the first TSC session requirement parameter, the latency between the first UE and the DS-TT, the transmission latency of the NW-TT of the first UE, the latency between the second UE and the DS-TT, and the transmission latency of the NW-TT of the second UE, and respectively transmit the calculated QoS requirements to the first PCF and the second PCF with reference to the first information and the second information.

It is to be understood that the first PCF and the second PCF described above are generally different network elements.

In step 304, the first PCF maps the QoS requirement of the first service flow to a QoS policy of the first service flow.

In this embodiment, a TSN communication system sets a QoS flow according to a QoS requirement of the service flow, and the first PCF is responsible for policy control of the first UE. Therefore, after the QoS requirement of the first service flow transmitted by the first network device is received, the QoS requirement of the first service flow may be mapped to the QoS policy of the first service flow. In this way, the QoS policy of the first service flow may be transmitted to the corresponding first SMF, so that the first SMF maps the first service flow to a QoS flow according to the QoS policy of the first service flow, thereby establishing a first QoS flow for transmitting service data of the first UE.

It is to be understood that, after receiving the QoS requirement of the first service flow transmitted by the first network device, the first PCF correspondingly obtains the latency requirement in the QoS requirement of the first service flow. In this case, the first PCF may modify a value corresponding to the latency requirement in the QoS requirement of the first service flow, so as to obtain a latency value in the QoS policy of the first service flow. In this way, after the first PCF obtains the QoS policy of the first service flow through mapping, the latency value in the QoS requirement of the first service flow may not be included in the QoS policy of the first service flow.

The first PCF may not modify the value corresponding to the latency requirement in the QoS requirement of the first service flow. In this case, the obtained latency value in the QoS policy of the first service flow is equal to the value corresponding to the latency requirement in the QoS requirement of the first service flow.

In step 305, the first PCF transmits the QoS policy of the first service flow and the first information to the first SMF.

In this embodiment, a 5G communication system establishes a QoS flow according to a QoS requirement of a service flow, and a main feature of the QoS requirement of the service flow is a latency requirement of the service flow. The QoS policy of the first service flow includes the latency value in the QoS policy of the first service flow. Therefore, the first PCF may transmit the QoS policy of the first service flow to the first SMF, so that the first SMF can obtain the QoS policy of the first service flow and the latency value in the QoS policy of the first service flow.

The latency value in the QoS policy of the first service flow is specified so that in a process of establishing the first QoS flow for transmitting the service data of the first UE, the first SMF sets a PDB value of the first QoS flow that needs to be established to be less than or equal to the latency value in the QoS policy of the first service flow. In this way, when the first QoS flow transmits the first service flow, the transmission latency is less than or equal to the latency value in the QoS policy of the first service flow provided by the first PCF.

In step 306, the first SMF establishes, according to the QoS policy of the first service flow in a case of setting the PDB value of the first QoS flow to be less than or equal to the latency value in the QoS policy of the first service flow, the first QoS flow for transmitting the service data of the first UE.

In this embodiment, the QoS policy of the first service flow includes a QoS parameter applied to establishment of the QoS flow, for example, the latency value in the QoS policy of the first service flow. Therefore, when setting the PDB value of the first QoS flow to be less than or equal to the latency value in the QoS policy of the first service flow, the first SMF may establish, according to the QoS policy of the first service flow, the first QoS flow for transmitting the service data of the first UE. In addition, according to the first information of the first UE provided by the first PCF, when the first QoS flow is established for the first UE, the first SMF may allocate a first port on a corresponding DS-TT and a second port on a corresponding NW-TT to the first QoS flow, so as to form a port pair.

In step 307, the first SMF maps the QoS policy of the first service flow and the TSCAI information to an N2 session message, and maps the QoS policy of the first service flow to an N1 session message.

In this embodiment, the first SMF may map the QoS parameter included in the QoS policy of the first service flow to a QoS profile, then load it into the N2 session message with reference to the TSCAI information included in the foregoing received first information of the first UE, and provide the N2 session message to the 5G base station gNB corresponding to the first UE. In addition, the QoS parameter included in the QoS policy of the first service flow further needs to be mapped to a QoS rule, and the DS-TT port configuration information included in the received first information of the first UE needs to be loaded into the N1 session message to be provided to the first UE. It is to be understood that, because the described TSCAI information is a parameter value based on the TSN clock domain, the first SMF needs to convert the TSCAI information into a clock domain value of the 5G system in a form of mapping or the like.

In step 308, the first SMF transmits the N2 session message and the N1 session message to a first AMF.

In step 309, the first AMF transmits the N1 session message to the first UE.

In this embodiment, after the first UE receives a QoS rule transmitted by the first AMF and DS-TT port management information in the first information, after configuring service flow data, the first UE may transmit the service flow data to the second UE according to the QoS rule and the TSC port management information or receive service flow data transmitted by the second UE, thereby establishing TSC communication between the first UE and the second UE.

In step 310, the second PCF maps the QoS requirement of the second service flow to a QoS policy of the second service flow.

In this embodiment, the 5G communication system establishes a QoS flow according to a QoS requirement of the service flow, and the second PCF is responsible for policy control of the second UE. Therefore, after the QoS requirement of the second service flow transmitted by the first network device is received, the QoS requirement of the second service flow may be mapped to the QoS policy of the second service flow. In this way, the QoS policy of the second service flow may be transmitted to the corresponding second SMF, so that the second SMF maps the second service flow to a QoS flow according to the QoS policy of the second service flow, thereby establishing a second QoS flow for transmitting service data of the second UE.

It is to be understood that, after receiving the QoS requirement of the second service flow transmitted by the first network device, the second PCF correspondingly obtains the latency requirement in the QoS requirement of the second service flow. In this case, the second PCF may modify a value corresponding to the latency requirement in the QoS requirement of the second service flow, so as to obtain a latency value in the QoS policy of the second service flow. In this way, after the second PCF obtains the QoS policy of the second service flow through mapping, the latency value in the QoS policy of the second service flow may also be included into the QoS policy of the second service flow.

The second PCF may not modify the value corresponding to the latency requirement in the QoS requirement of the second service flow. In this case, the obtained latency value in the QoS policy of the second service flow is equal to the value corresponding to the latency requirement in the QoS requirement of the second service flow.

In step 311, the second PCF transmits the QoS policy of the second service flow and the second information to the second SMF.

In this embodiment, a 5G communication system establishes a QoS flow according to a QoS requirement of a service flow, and a main feature of the QoS requirement of the service flow is a latency requirement of the service flow. The QoS policy of the second service flow includes the latency value in the QoS policy of the second service flow. Therefore, the second PCF may transmit the QoS policy of the second service flow to the corresponding second SMF, so that the second SMF can obtain the QoS policy of the second service flow and the latency value in the QoS policy of the second service flow.

The latency value in the QoS policy of the second service flow is specified so that in a process of establishing the second QoS flow for transmitting the service data of the second UE, the second SMF sets a PDB value of the second QoS flow that needs to be established to be less than or equal to the latency value in the QoS policy of the second service flow. In this way, when the second QoS flow transmits the second service flow, the transmission latency is less than or equal to the latency value in the QoS policy of the second service flow provided by the second PCF.

In step 312, the second SMF establishes, according to the QoS policy of the second service flow in a case of setting the PDB value of the second QoS flow to be less than or equal to the latency value in the QoS policy of the second service flow, the second QoS flow for transmitting the service data of the second UE.

In this embodiment, the QoS policy of the second service flow includes a QoS parameter applied to establishment of the QoS flow, for example, the latency value in the QoS policy of the second service flow. Therefore, when setting the PDB value of the second QoS flow to be less than or equal to the latency value in the QoS policy of the second service flow, the second SMF may establish, according to the QoS policy of the second service flow, the second QoS flow for transmitting the service data of the second UE. In addition, according to the second information of the second UE provided by the second PCF, when the second QoS flow is established for the second UE, the second SMF may allocate a first port on a corresponding DS-TT and a second port on a corresponding NW-TT to the second QoS flow, so as to form a port pair.

In step 313, the second SMF maps the QoS policy of the second service flow and the TSCAI information to an N2 session message, and maps the QoS policy of the second service flow to an N1 session message.

In this embodiment, specifically, the second SMF may map the QoS parameter included in the QoS policy of the second service flow to a QoS profile, then load it into the N2 session message with reference to the TSCAI information included in the foregoing received second information of the second UE, and provide the N2 session message to the 5G base station gNB corresponding to the second UE. In addition, the QoS parameter included in the QoS policy of the second service flow further needs to be mapped to a QoS rule, and the DS-TT port configuration information included in the received second information of the second UE needs to be loaded into the N1 session message to be provided to the second UE. It is to be understood that, because the described TSCAI information is a parameter value based on the TSN clock domain, the second SMF needs to convert the TSCAI information into a clock domain value of the 5G system in a form of mapping or the like.

In step 314, the second SMF transmits the N2 session message and the N1 session message to a second AMF.

In step 315, the second AMF transmits the N1 session message to the second UE.

In this embodiment, after the second UE receives a QoS rule transmitted by the second AMF and the DS-TT port management information in the second information, after configuring service flow data, the second UE may transmit the service flow data to the first UE according to the QoS rule and the TSC port management information or receive service flow data transmitted by the first UE, thereby establishing TSC communication between the first UE and the second UE.

It is to be understood that an execution sequence of steps 304-309 and steps 310-315 is not limited. In actual application, steps 310-315 may be performed before steps 304-309, or steps 304-309 and steps 310-315 may be performed synchronously. This is not specifically limited in this embodiment of this disclosure.

In this embodiment of this disclosure, the first UE initiates a TSC communication request, so that after determining the QoS requirement of the first service flow and the QoS requirement of the second service flow, the first network device separately provides the QoS requirement of the first service flow and the QoS requirement of the second service flow to 5G networks in which the first UE and the second UE are located, thereby separately triggering establishment of the first QoS flow used for transmitting the service data of the first UE, and triggering establishment of the second QoS flow used for transmitting the service data of the second UE, so that the UE initiates the TSC communication request to establish the TSC transmission channel between the first UE and the second UE.

The foregoing mainly describes the solutions provided in the embodiments of this disclosure from a perspective of interaction. It may be understood that, to implement the foregoing functions, hardware structures and/or software modules corresponding to each function are executed. A person skilled in the art is to easily recognize that, with reference to the modules and algorithm steps of the examples described in the embodiments disclosed herein, this disclosure can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

According to the embodiments of this disclosure, the apparatus may be divided into functional modules based on the foregoing method examples. For example, each functional module may be obtained through division corresponding to each function, or two or more functions may be integrated into one processing module. The integrated module may be implemented in the form of hardware, or may be implemented in the form of a software functional module. Module division in the embodiments of this disclosure is an example, and is merely logical function division. In actual implementation, there may be another division manner.

Figure 4:
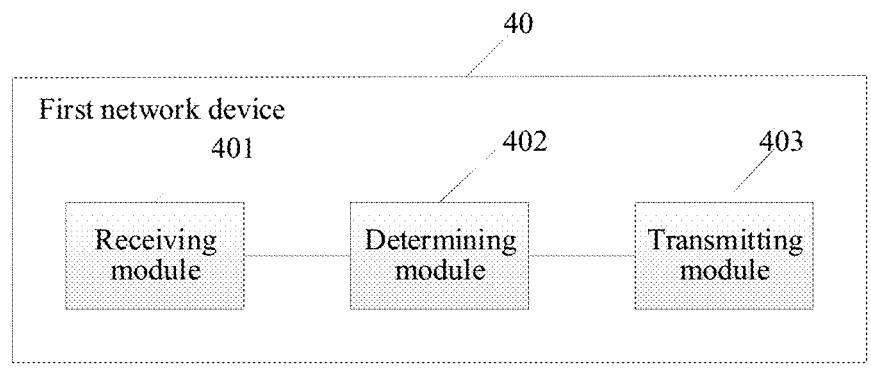
FIG. 4 is a schematic diagram of an embodiment of a first network device according to an embodiment of this disclosure.

The following describes in detail a first network device 40 in an embodiment of this disclosure. FIG. 4 is a schematic diagram of an embodiment of the first network device 40 according to an embodiment of this disclosure. The first network device 40 may include a receiving module 401, a determining module 402, and a transmitting module 403. One or more modules of the apparatus can be implemented by processing circuitry, software, or a combination thereof, for example.

The receiving module 401 is configured to receive TSC communication request transmitted by a first UE, the TSC communication request carrying a first TSC session requirement parameter, and the first TSC session requirement parameter including an identifier of a second UE and a QoS requirement of a TSC session.

The determining module 402 is configured to determine a QoS requirement of a first service flow, a QoS requirement of a second service flow, first information, and second information according to the first TSC session requirement parameter.

The transmitting module 403 is configured to transmit the QoS requirement of the first service flow and the first information to a first PCF corresponding to the first UE, and transmit the QoS requirement of the second service flow and the second information to a second PCF corresponding to the second UE according to the identifier of the second UE, the QoS requirement of the first service flow being used for being mapped to a QoS policy of the first service flow by using the first PCF, the QoS policy of the first service flow being used for establishing, by using a first SMF, a first QoS flow for transmitting service data of the first UE, the QoS requirement of the second service flow being used for being mapped to a QoS policy of the second service flow by using the second PCF, and the QoS policy of the second service flow being used for establishing, by using a second SMF, a second QoS flow for transmitting service data of the second UE.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In one implementation, the determining module 402 is configured to determine a latency requirement in the QoS requirement of the first service flow and a latency requirement in the QoS requirement of the second service flow.

In one implementation, the determining module 402 is configured to determine, when the first UE and the second UE are connected to different UPF network elements, the latency requirement in the QoS requirement of the first service flow according to a latency in the first TSC session requirement parameter, a latency between the first UE and a DS-TT, a transmission latency of an NW-TT of the first UE, a latency between the second UE and the DS-TT, and a transmission latency of an NW-TT of the second UE, and determine the latency requirement in the QoS requirement of the second service flow according to the latency in the first TSC session requirement parameter, the latency between the first UE and the DS-TT, the transmission latency of the NW-TT of the first UE, the latency between the second UE and the DS-TT, and the transmission latency of the NW-TT of the second UE.

In one implementation, the determining module 402 is configured to determine, when the first UE and the second UE are connected to the same UPF network element, the latency requirement in the QoS requirement of the first service flow according to a latency in the first TSC session requirement parameter, a latency between the first UE and a DS-TT, and a latency between the second UE and the DS-TT, and determine the latency requirement in the QoS requirement of the second service flow according to the latency in the first TSC session requirement parameter, the latency between the first UE and the DS-TT, and the latency between the second UE and the DS-TT.

In one implementation, the transmitting module 403 is further configured to transmit the latency requirement in the QoS requirement of the first service flow to the first PCF, so that the first SMF sets a PDB value of the first QoS flow to be less than or equal to a latency value in the QoS policy of the first service flow, the latency value in the QoS policy of the first service flow being obtained by the first PCF according to a value corresponding to the latency requirement in the QoS requirement of the first service flow. The transmitting module 403 is further configured to transmit the latency requirement in the QoS requirement of the second service flow to the second PCF, so that the second SMF sets a PDB value of the second QoS flow to be less than or equal to a latency value in the QoS policy of the second service flow, the latency value in the QoS policy of the second service flow being obtained by the second PCF according to a value corresponding to the latency requirement in the QoS requirement of the second service flow.

In one implementation, the determining module 402 is further configured to before the transmitting module 403 transmits the QoS requirement of the first service flow and the first information to the first PCF corresponding to the first UE, determine the first PCF according to an identifier of the first UE.

In one implementation, the determining module 402 is further configured to before the transmitting module 403 transmits the QoS requirement of the second service flow and the second information to the second PCF corresponding to the second UE, determine the second PCF corresponding to the second UE according to the identifier of the second UE.

Figure 5:
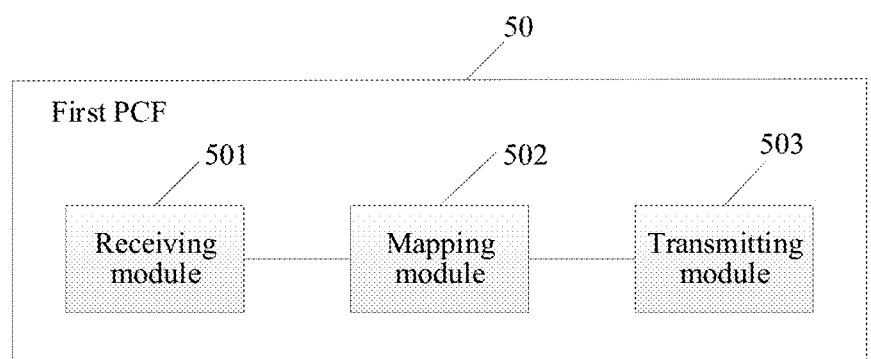
FIG. 5 is a schematic diagram of an embodiment of a first PCF according to an embodiment of this disclosure.

As shown in FIG. 5, an embodiment of a first PCF 50 provided in an embodiment of this disclosure may include a receiving module 501, a mapping module 502, and a transmitting module 503. One or more modules of the apparatus can be implemented by processing circuitry, software, or a combination thereof, for example.

The receiving module 501 is configured to receive a QoS requirement of a first service flow and first information that are transmitted by a first network device, the first PCF corresponding to a first UE.

The mapping module 502 is configured to map the QoS requirement of the first service flow to a QoS policy of the first service flow.

The transmitting module 503 is configured to transmit the QoS policy of the first service flow and the first information to a first SMF, the QoS policy of the first service flow being used for establishing, by using the first SMF, a first QoS flow for transmitting service data of the first UE.

In one implementation, the receiving module 501 is further configured to receive a latency requirement in the QoS requirement of the first service flow transmitted by the first network device. In one implementation, the transmitting module 503 is further configured to transmit a latency value in the QoS policy of the first service flow to the first SMF, so that the first SMF sets a PDB value of the first QoS flow to be less than or equal to a latency value in the QoS policy of the first service flow, the latency value in the QoS policy of the first service flow being obtained by the first PCF according to a value corresponding to the latency requirement in the QoS requirement of the first service flow.

Figure 6:
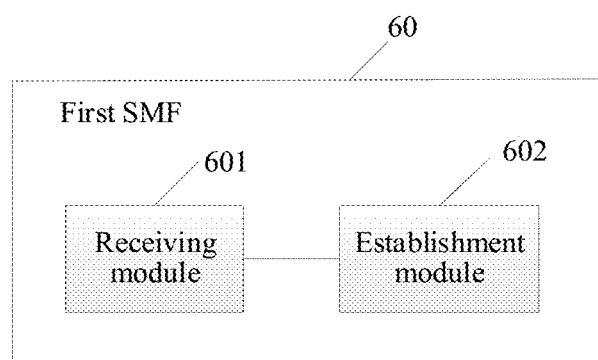
FIG. 6 is a schematic diagram of an embodiment of a first SMF according to an embodiment of this disclosure.

As shown in FIG. 6, an embodiment of a first SMF 60 provided in an embodiment of this disclosure may include a receiving module 601 and an establishing module 602. One or more modules of the apparatus can be implemented by processing circuitry, software, or a combination thereof, for example.

The receiving module 601 is configured to receive a QoS policy of a first service flow and first information that are transmitted by a first PCF, the first PCF corresponding to a first UE.

The establishment module 602 is configured to establish, according to the QoS policy of the first service flow, a first QoS flow for transmitting service data of the first UE.

In one implementation, the receiving module 601 is further configured to receive a latency value in the QoS policy of the first service flow transmitted by the first PCF.

In one implementation the establishment module 602 is configured to establish, according to the QoS policy of the first service flow in a case of setting a PDB value of the first QoS flow to be less than or equal to the latency value in the QoS policy of the first service flow, the first QoS flow for transmitting the service data of the first UE.

In one implementation, the first SMF 60 further includes a mapping module, configured to after the first QoS flow for transmitting the service data of the first UE is established according to the QoS policy of the first service flow, map the QoS policy of the first service flow and TSCAI information to an N2 session message, and map the QoS policy of the first service flow to an N1 session message, the first information including the TSCAI information.

Figure 7:
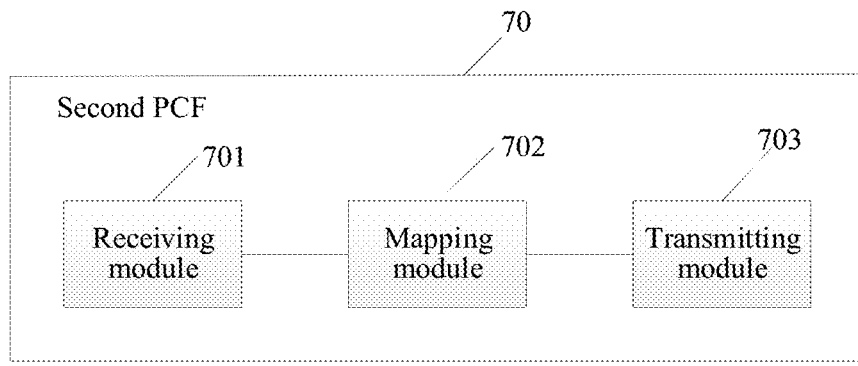
FIG. 7 is a schematic diagram of an embodiment of a second PCF according to an embodiment of this disclosure.

As shown in FIG. 7, an embodiment of a second PCF 70 provided in an embodiment of this disclosure may include a receiving module 701, a mapping module 702, and a transmitting module 703. One or more modules of the apparatus can be implemented by processing circuitry, software, or a combination thereof, for example.

The receiving module 701 is configured to receive a QoS requirement of a second service flow and second information that are transmitted by a first network device, the second PCF corresponding to a second UE.

The mapping module 702 is configured to map the QoS requirement of the second service flow to a QoS policy of the second service flow.

The transmitting module 703 is configured to transmit the QoS policy of the second service flow and the second information to a second SMF, the QoS policy of the second service flow being used for establishing, by using the second SMF, a second QoS flow for transmitting service data of the second UE.

In one implementation, the receiving module 701 is further configured to receive a latency requirement in the QoS requirement of the second service flow transmitted by the first network device; and the transmitting module 703 is further configured to transmit a latency value in the QoS policy of the second service flow to the second SMF, so that the second SMF sets a PDB value of the second QoS flow to be less than or equal to a latency value in the QoS policy of the second service flow, the latency value in the QoS policy of the second service flow being obtained by the second PCF according to a value corresponding to the latency requirement in the QoS requirement of the second service flow.

Figure 8:
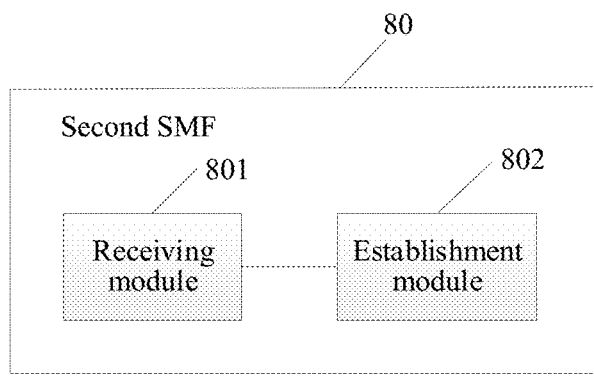
FIG. 8 is a schematic diagram of an embodiment of a second SMF according to an embodiment of this disclosure.

As shown in FIG. 8, an embodiment of a second SMF 80 provided in an embodiment of this disclosure may include a receiving module 801 and an establishment module 802. One or more modules of the apparatus can be implemented by processing circuitry, software, or a combination thereof, for example.

The receiving module 801 is configured to receive a QoS policy of a second service flow and second information that are transmitted by a second PCF, the second PCF corresponding to a second UE.

The establishment module 802 is configured to establish, according to the QoS policy of the second service flow, a second QoS flow for transmitting service data of the second UE.

In one implementation, the receiving module 801 is further configured to receive a latency value in the QoS policy of the second service flow transmitted by the second PCF; and the establishment module 802 is configured to: establish, according to the QoS policy of the second service flow in a case of setting a PDB value of the second QoS flow to be less than or equal to the latency value in the QoS policy of the second service flow, the second QoS flow for transmitting the service data of the second UE.

In one implementation, the second SMF 80 further includes a mapping module, configured to: after the second QoS flow for transmitting the service data of the second UE is established according to the QoS policy of the second service flow, map the QoS policy of the second service flow and TSCAI information to an N2 session message, and map the QoS policy of the second service flow to an N1 session message, the second information including the TSCAI information.

It may be understood that the foregoing functions are implemented by the first network device, the first PCF, the first SMF, the second PCF, and the second SMF, and the foregoing functions include a hardware structure and/or a software module corresponding to each function. A person skilled in the art is to easily recognize that, with reference to the functions described in the embodiments disclosed in this specification, this disclosure can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

As described from a perspective of an entity apparatus, the first network device, the first PCF, the first SMF, the second PCF, and the second SMF may be implemented by one entity apparatus, or may be implemented jointly by a plurality of entity apparatuses, or may be a logical function unit in one entity apparatus. This is not specifically limited in this embodiment of this disclosure.

Figure 9:
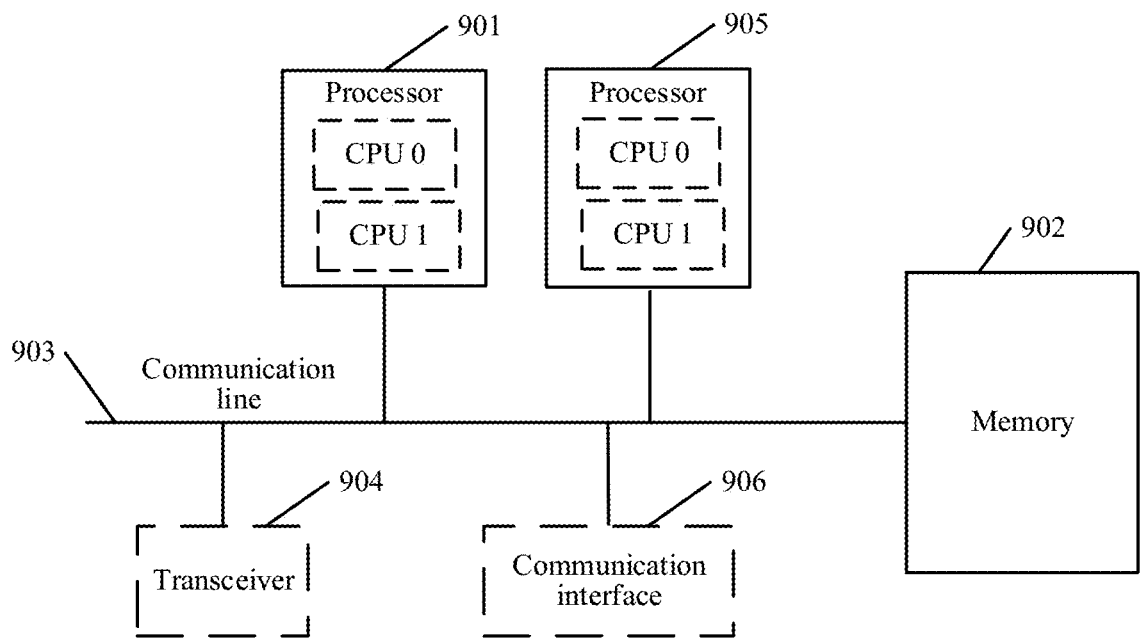
FIG. 9 is a schematic structural diagram of hardware of a communication device according to an embodiment of this disclosure.

For example, the first network device, the first PCF, the first SMF, the second PCF, or the second SMF may be implemented by a communication device in FIG. 9. FIG. 9 is a schematic structural diagram of hardware of a communication device according to an embodiment of this disclosure. The communication device includes at least one processor 901 (processing circuitry), a memory 902, and a communication line 903. The communication device may further include at least one of a transceiver 904 or a communication interface 906.

The processor 901 may be a central processing unit (CPU) (an example of processing circuitry), a microprocessor, an application-specific integrated circuit (ASIC), or one or more integrated circuits configured to control program execution of the solutions of this disclosure.

The communication line 903 may include a channel for transmitting information between the foregoing components.

The transceiver 904 uses any apparatus like a transceiver, and is configured to communicate with another device or a communication network, such as Ethernet, a radio access network (RAN) or a wireless local area network (WLAN). The transceiver 904 may alternatively be a transceiver circuit.

The communication device may also include the communication interface 906.

The memory 902 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital universal optical disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor 901 by using the communication line 903. Alternatively, the memory 902 may be integrated into the processor 901.

The memory 902 is configured to store computer executable instructions used for executing the solutions of this disclosure, and the execution is under control of the processor 901. The processor 901 is configured to execute the computer executable instructions stored in the memory 902, so as to implement the data transmission method provided in the foregoing method embodiments of this disclosure.

In one implementation, the computer executable instructions in this embodiment of this disclosure may also be referred to as application program code. This is not specifically limited in this embodiment of this disclosure.

In specific implementation, in an embodiment, the processor 901 may include one or more CPUs, for example, a CPU 0 and a CPU 1 in FIG. 9.

In specific implementation, in an embodiment, the communication device may include a plurality of processors, such as the processor 901 and a processor 905 in FIG. 9. Each of these processors may be a single-CPU (single-CPU) processor, or may be a multi-CPU (multi-CPU) processor. The processor herein may refer to one or more devices, circuits, and/or processing cores configured to process data (for example, computer executable instructions).

From a perspective of a function unit, this disclosure may divide a function unit of the first network device, the first PCF, the first SMF, the second PCF, or the second SMF according to the foregoing method embodiments. For example, function unit division may be performed corresponding to the functions, or two or more functions may be integrated into one function unit. The integrated functional module may be implemented in the form of hardware, or may be implemented in the form of a software functional module.

The receiving module 401, the transmitting module 403, the receiving module 501, the transmitting module 503, the receiving module 601, the receiving module 701, the transmitting module 703, and the receiving module 801 may all be implemented by using the transceiver 904. The determining module 402, the mapping module 502, the establishment module 602, the mapping module 603, the mapping module 702, the establishment module 802, and the mapping module 803 may all be implemented by using the processor 901 or the processor 905.

All or some of the foregoing embodiments may be implemented by using software, hardware, firmware, or any combination thereof. When software is used for implementation, all or some of the embodiments may be implemented in a form of a computer program product.

The computer program product includes one or more computer instructions. When the computer program instructions are loaded and executed on a computer, all or some of the procedures or functions according to the embodiments of this disclosure are generated. The computer may be a general-purpose computer, a dedicated computer, a computer network, or other programmable apparatuses. The computer instruction may be stored in a non-transitory computer-readable storage medium or may be transmitted from a computer-readable storage medium to another computer-readable storage medium. For example, the computer instruction may be transmitted from a website, computer, server, or data center to another website, computer, server, or data center in a wired (such as a coaxial cable, an optical fiber, or a digital subscriber line (DSL)) or wireless (such as infrared, radio, or microwave or the like) manner. The computer-readable storage medium may be any usable medium accessible by the computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk Solid State Disk (SSD)), or the like.

A person of ordinary skill in the art may understand that all or some of the steps of the methods in the embodiments may be implemented by a program instructing relevant hardware. The program may be stored in a computer readable storage medium. The storage medium may include: a ROM, a RAM, a magnetic disk, or an optical disc.

The method for data transmission and manage QoS flow, and the device and storage medium provided in the embodiments of this disclosure are described in detail above. Although the principles and implementations of this disclosure are described by using specific examples herein, the descriptions of the foregoing embodiments are merely intended to help understand the method and the core idea of this disclosure. Meanwhile, a person skilled in the art may make modifications to the specific implementations and application range according to the idea of this disclosure. In conclusion, the content of this specification is not to be construed as a limitation to this disclosure.

The invention claimed is:

1. A data transmission method, comprising:
receiving, by a first network device, a time sensitive communication (TSC) communication request transmitted by a first user equipment (UE), the TSC communication request including a first TSC session requirement parameter comprising an identifier of a second UE and a quality of service (QOS) requirement of a TSC session;
determining, by the first network device based on the first TSC session requirement parameter included in the TSC communication request, a QoS requirement of a first service flow, a QoS requirement of a second service flow, first information to be transmitted to a first policy control function (PCF) corresponding to the first UE, and second information to be transmitted to a second PCF corresponding to the second UE;
transmitting, by the first network device, the determined QoS requirement of the first service flow and the determined first information to the first PCF corresponding to the first UE; and
transmitting, by the first network device, the determined QoS requirement of the second service flow and the determined second information to the second PCF corresponding to the second UE according to the identifier of the second UE.

2. The method according to claim 1, wherein the determining further comprises:
determining, by the first network device, a latency requirement in the QoS requirement of the first service flow and a latency requirement in the QoS requirement of the second service flow.

3. The method according to claim 2, wherein the determining further comprises:
determining, by the first network device when the first UE and the second UE are connected to different UPF network elements, the latency requirement in the determined QoS requirement of the first service flow according to a latency in the first TSC session requirement parameter, a latency between the first UE and a device-side TSN translator (DS-TT), a transmission latency of a network-side TSN translator (NW-TT) of the first UE, a latency between the second UE and the DS-TT, and a transmission latency of an NW-TT of the second UE; and
determining the latency requirement in the determined QoS requirement of the second service flow according to the latency in the first TSC session requirement parameter, the latency between the first UE and the DS-TT, the transmission latency of the NW-TT of the first UE, the latency between the second UE and the DS-TT, and the transmission latency of the NW-TT of the second UE.

4. The method according to claim 2, wherein the determining further comprises:
determining, by the first network device when the first UE and the second UE are connected to a same UPF network element, the latency requirement in the determined QoS requirement of the first service flow according to a latency in the first TSC session requirement parameter, a latency between the first UE and a DS-TT, and a latency between the second UE and the DS-TT; and
determining the latency requirement in the determined QoS requirement of the second service flow according to the latency in the first TSC session requirement parameter, the latency between the first UE and the DS-TT, and the latency between the second UE and the DS-TT.

5. The method according to claim 2, wherein
the transmitting the determined QoS requirement of the first service flow includes transmitting, by the first network device, the latency requirement in the determined QoS requirement of the first service flow to the first PCF, so that a first session management function (SMF) sets a PDB value of the first QoS flow to be less than or equal to a latency value in the QoS policy of the first service flow, the latency value in the QoS policy of the first service flow being obtained by the first PCF according to a value corresponding to the latency requirement in the determined QoS requirement of the first service flow; and
the transmitting the determined QoS requirement of the second service flow includes transmitting, by the first network device, the latency requirement in the determined QoS requirement of the second service flow to the second PCF, so that a second SMF sets a PDB value of the second QoS flow to be less than or equal to a latency value in the QoS policy of the second service flow, the latency value in the QoS policy of the second service flow being obtained by the second PCF according to a value corresponding to the latency requirement in the determined QoS requirement of the second service flow.

6. The method according to claim 1, further comprising:
determining, by the first network device, the first PCF according to an identifier of the first UE.

7. The method according to claim 1, wherein the transmitting the determined QoS requirement of the second service flow and the determined second information to the second PCF further comprises:
determining, by the first network device, the second PCF corresponding to the second UE according to the identifier of the second UE; and
transmitting, by the first network device, the determined QoS requirement of the second service flow and the determined second information to the determined second PCF.

8. The method according to claim 1, wherein the determined first information comprises port configuration information of a DS-TT and a first UPF of the first UE, and the determined second information comprises port configuration information of a DS-TT and a second UPF of the second UE.

9. A first network device, comprising:
processing circuitry configured to:
receive a time sensitive communication (TSC) communication request transmitted by a first user equipment (UE), the TSC communication request including a first TSC session requirement parameter comprising an identifier of a second UE and a quality of service (QOS) requirement of a TSC session;

determine, based on the first TSC session requirement parameter included in the TSC communication request, a QoS requirement of a first service flow, a QoS requirement of a second service flow, first information to be transmitted to a first policy control function (PCF) corresponding to the first UE, and second information to be transmitted to a second PCF corresponding to the second UE;

transmit the determined QoS requirement of the first service flow and the determined first information to the first PCF corresponding to the first UE; and transmit the determined QoS requirement of the second service flow and the determined second information to the second PCF corresponding to the second UE according to the identifier of the second UE.

10. The first network device according to claim 9, wherein the processing circuitry is configured to:

determine a latency requirement in the QoS requirement of the first service flow and a latency requirement in the QoS requirement of the second service flow.

11. The first network device according to claim 10, wherein the processing circuitry is configured to:

determine, when the first UE and the second UE are connected to different UPF network elements, the latency requirement in the determined QoS requirement of the first service flow according to a latency in the first TSC session requirement parameter, a latency between the first UE and a device-side TSN translator (DS-TT), a transmission latency of a network-side TSN translator (NW-TT) of the first UE, a latency between the second UE and the DS-TT, and a transmission latency of an NW-TT of the second UE; and determine the latency requirement in the determined QoS requirement of the second service flow according to the latency in the first TSC session requirement parameter, the latency between the first UE and the DS-TT, the transmission latency of the NW-TT of the first UE, the latency between the second UE and the DS-TT, and the transmission latency of the NW-TT of the second UE.

12. The first network device according to claim 10, wherein the processing circuitry is configured to:

determine, when the first UE and the second UE are connected to a same UPF network element, the latency requirement in the determined QoS requirement of the first service flow according to a latency in the first TSC session requirement parameter, a latency between the first UE and a DS-TT, and a latency between the second UE and the DS-TT; and determine the latency requirement in the determined QoS requirement of the second service flow according to the latency in the first TSC session requirement parameter, the latency between the first UE and the DS-TT, and the latency between the second UE and the DS-TT.

13. The first network device according to claim 10, wherein the processing circuitry is configured to:

transmit the latency requirement in the determined QOS requirement of the first service flow to the first PCF, so that a first session management function (SMF) sets a PDB value of the first QoS flow to be less than or equal to a latency value in the QoS policy of the first service flow, the latency value in the QoS policy of the first service flow being obtained by the first PCF according to a value corresponding to the latency requirement in the determined QoS requirement of the first service flow; and transmit the latency requirement in the determined QoS requirement of the second service flow to the second PCF, so that a second SMF sets a PDB value of the second QoS flow to be less than or equal to a latency value in the QoS policy of the second service flow, the latency value in the QoS policy of the second service flow being obtained by the second PCF according to a value corresponding to the latency requirement in the determined QoS requirement of the second service flow.

14. The first network device according to claim 9, wherein the processing circuitry is configured to:

determine the first PCF according to an identifier of the first UE.

15. The first network device according to claim 9, wherein the processing circuitry is configured to:

determine the second PCF corresponding to the second UE according to the identifier of the second UE; and transmit the determined QoS requirement of the second service flow and the determined second information to the determined second PCF.

16. The first network device according to claim 9, wherein the determined first information comprises port configuration information of a DS-TT and a first UPF of the first UE, and the determined second information comprises port configuration information of a DS-TT and a second UPF of the second UE.

17. A non-transitory computer-readable storage medium storing instructions which when executed by a processor of a first network device, cause the processor to perform:

receiving a time sensitive communication (TSC) communication request transmitted by a first user equipment (UE), the TSC communication request including a first TSC session requirement parameter comprising an identifier of a second UE and a quality of service (QOS) requirement of a TSC session;

determining, based on the first TSC session requirement parameter included in the TSC communication request, a QOS requirement of a first service flow, a QoS requirement of a second service flow, first information to be transmitted to a first policy control function (PCF) corresponding to the first UE, and second information to be transmitted to a second PCF corresponding to the second UE;

transmitting, by the first network device, the determined QoS requirement of the first service flow and the determined first information to the first PCF corresponding to the first UE; and transmitting, by the first network device, the determined QoS requirement of the second service flow and the determined second information to the second PCF corresponding to the second UE according to the identifier of the second UE.

18. The non-transitory computer-readable storage medium according to claim 17, wherein the determining further comprises:

determining, by the first network device, a latency requirement in the QoS requirement of the first service flow and a latency requirement in the QoS requirement of the second service flow.

19. The non-transitory computer-readable storage medium according to claim 18, wherein the determining further comprises:

determining, by the first network device when the first UE and the second UE are connected to different UPF network elements, the latency requirement in the determined QoS requirement of the first service flow according to a latency in the first TSC session requirement parameter, a latency between the first UE and a device-side TSN translator (DS-TT), a transmission latency of a network-side TSN translator (NW-TT) of the first UE, a latency between the second UE and the DS-TT, and a transmission latency of an NW-TT of the second UE; and determining the latency requirement in the determined QoS requirement of the second service flow according to the latency in the first TSC session requirement parameter, the latency between the first UE and the DS-TT, the transmission latency of the NW-TT of the first UE, the latency between the second UE and the DS-TT, and the transmission latency of the NW-TT of the second UE.

20. The non-transitory computer-readable storage medium according to claim 18, wherein the determining further comprises:

determining, by the first network device when the first UE and the second UE are connected to a same UPF network element, the latency requirement in the determined QoS requirement of the first service flow according to a latency in the first TSC session requirement parameter, a latency between the first UE and a DS-TT, and a latency between the second UE and the DS-TT; and determining the latency requirement in the determined QoS requirement of the second service flow according to the latency in the first TSC session requirement parameter, the latency between the first UE and the DS-TT, and the latency between the second UE and the DS-TT.

* * * * *